Powers & Stevens,
Horse Power,
N° 64,791. Patented May 14, 1867.
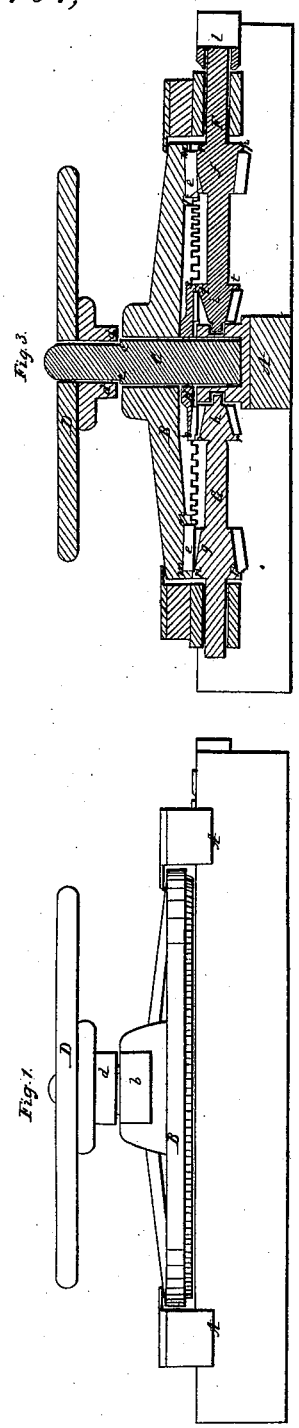
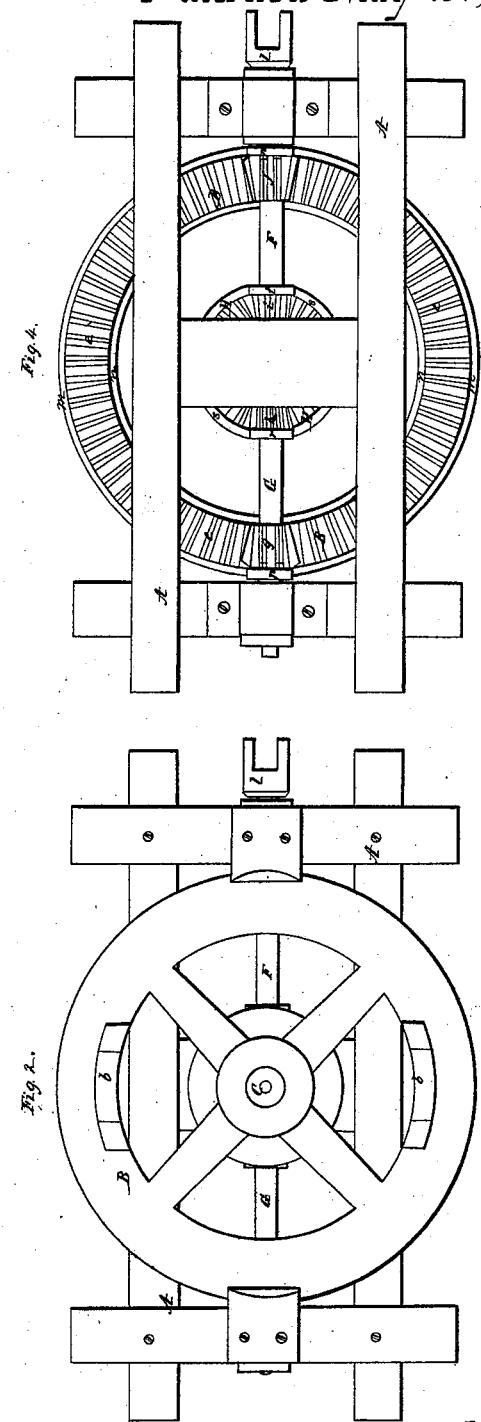
Witnesses:
Thomas F. Parker.
Emeline J. Brown.
Inventors:
D. J. Powers
Henry B. Stevens.
By their atty,
J. S. Brown.

United States Patent Office.

D. J. POWERS AND HENRY B. STEVENS, OF MADISON, WISCONSIN, ASSIGNORS BY MESNE ASSIGNMENTS TO BUFFALO AGRICULTURAL MACHINE WORKS.

*Letters Patent No. 64,791, dated May 14, 1867.*

IMPROVEMENT IN HORSE-POWERS.

*The Schedule referred to in these Letters Patent and making part of the same.*

TO ALL WHOM IT MAY CONCERN:

Be it known that we, D. J. POWERS and HENRY B. STEVENS, of Madison, in the county of Dane, and State of Wisconsin, have invented an improved Horse-Power; and we do hereby declare that the following is a full and exact description thereof, reference being had to the accompanying drawings, making part of this specification—

Figure 1 being a side elevation of the horse-power.

Figure 2, a top view thereof.

Figure 3, a central vertical section of the same.

Figure 4, a view of the under side thereof.

Like letters designate corresponding parts in all of the figures.

Upon a suitable frame, A, the master-wheel B is mounted, and provided with suitable sockets or lugs $b$ $b$ for securing thereto the levers by which the horses turn it. It turns around a fixed pivot, C, secured firmly in a step, $a$. On the upper end of this pivot is also mounted a driver's platform or stand, D, which rests by a hub, $d$, on a shoulder, $c$, of the pivot. Thus the master-wheel is relieved of the weight of the driver and his platform, and the platform does not turn with the wheel to the inconvenience of the driver. The cogs $e$ $e$ of the master-wheel gear on one side into a pinion, $f$, on the driving-shaft F, and on the other side into a pinion, $g$, on an auxiliary shaft, G, from which the power is transferred by means of another pinion, $h$, on its inner end, and an intermediate wheel, H, which also gears into another pinion, $i$, on the driving-shaft to said driving-shaft. Thus nearly equal power is communicated directly to the driving-shaft F and mediately through the shaft G, whereby the strain upon the teeth of the gearing is equally divided so as to render the same less liable to breakage. The intermediate transferring wheel H turns freely around the pivot C, which thus keeps the gearing centred and balanced. This arrangement is also very compact. Outside of the teeth $e$ $e$ of the master-wheel B, and joined by casting to the ends of said teeth, is a flange or rim, $m$, projecting a little more than half as far as the teeth project; and similar flanges project corresponding distances in the same way at the outer ends of the teeth on the pinions $f$ and $g$. These flanges serve the triple purpose of strengthening the teeth of the wheel and pinions, of steadying the master-wheel, and of gauging the depth to which the teeth of the wheel and pinions intermatch, since the flange of the wheel rests on those of the pinions. Similar flanges $s$ $r$ and $t$ may also project respectively from the wheel H and pinions $h$ and $i$. There also may be a flange, $n$, projecting at the ends of the cogs of the master-wheel B for strengthening the same, though this is not so important as the other flange $m$.

What we claim as our invention, and desire to secure by Letters Patent, is—

The driver's platform D, when resting on a central fixed pivot, C, substantially as and for the purpose herein specified.

We also claim the transferring shaft and wheel G and H turning around the central pivot C, for the purpose specified.

We also claim the flanges $m$ and $p$ $p$, respectively, on the master-wheel B and pinions $f$ $g$, substantially as and for the purposes herein set forth.

We also claim the combination and arrangement of the master-wheel B, fixed pivot C, driver's platform D, and transferring shaft and wheel G and H as herein described.

The above specification of our improved horse-power signed by us this   day of November, 1866.

D. J. POWERS,
                                                                                       H. B. STEVENS.

Witnesses:
   H. C. SQUIER,
   CHARLES SMITH.